United States Patent [19]

Cribbs et al.

[11] Patent Number: 5,448,429
[45] Date of Patent: Sep. 5, 1995

[54] SELF-SERVOWRITING DISK DRIVE AND METHOD

[76] Inventors: Daniel F. Cribbs, 126 Vasona Oaks Dr., Los Gatos, Calif. 95030; Michael L. Ellenberger, 163 Frederick St., Santa Cruz, Calif. 95062; John W. Hassler, Jr., 654 Line St., Hollister, Calif. 95023

[21] Appl. No.: 274,676

[22] Filed: Jul. 12, 1994

Related U.S. Application Data

[63] Continuation of Ser. No. 974,255, Nov. 10, 1992, abandoned.

[51] Int. Cl.⁶ .............................................. G11B 5/012
[52] U.S. Cl. ........................................ 360/75; 360/51; 360/77.08; 360/77.06; 360/66; 369/58
[58] Field of Search ...................... 369/58; 360/56, 66, 360/77.06, 31, 51, 27, 75, 75 B, 77.08

[56] References Cited

U.S. PATENT DOCUMENTS

| | | | |
|---|---|---|---|
| 4,414,589 | 11/1983 | Oliver et al. | 360/31 X |
| 4,536,809 | 8/1985 | Sidman | 360/77.04 |
| 4,912,576 | 3/1990 | Janz | 360/77.07 |
| 5,175,719 | 12/1992 | Iimura | 369/58 |
| 5,241,433 | 8/1993 | Anderson et al. | 360/77.04 |
| 5,256,965 | 10/1993 | Nomura | 369/58 X |
| 5,379,171 | 1/1995 | Morehouse et al. | 360/105 |

OTHER PUBLICATIONS

Fowler et al., "Regenerative Clock Technique for Servo Track Writers" IBM TDB vol. 33 No. 5 pp. 310-311, Oct. '90.

*Primary Examiner*—Aristotelis Psitos
*Assistant Examiner*—James T. Wilson

[57] ABSTRACT

An embodiment of the present invention is a disk drive comprising a rotating disk with a recording surface, a transducer in communication with the surface and swept radially over the surface by a servo-actuator, a variable gain read amplifier connected to the transducer, an analog-to-digital converter (ADC) attached to the variable gain amplifier, an erase frequency oscillator coupled to the transducer for erasing of the disk surface, a memory for storing digital outputs appearing at the ADC, and a controller for signaling the servo-actuator to move to such radial positions that result in transducer read amplitudes that are a percentage of previous read amplitudes represented in the digital memory. Bit-synchronism between tracks is maintained by writing an initial clock track with closure and then writing a next clock track including a regular sequence of clock bursts a half-track space offset such that the initial clock track can be read in between writing clock bursts and the read signal is used to frequency-lock an oscillator which is used as a reference for the writing of clock bursts of the next track. A checkerboard pattern of clock bursts is thus created. All subsequent tracks are built incrementally by stepping off a half of a track from the last track written, which comprises clock bursts, and writing a next new sequence of clock bursts that interlace with the previous track's clock bursts.

11 Claims, 4 Drawing Sheets

SELF-SERVOWRITING DISK DRIVE AND METHOD

This application is a continuation of application Ser. No. 07/974,255, filed on Nov. 10, 1992 now abandoned.

BACKGROUND OF THE INVENTION

1. Field of the Invention

The invention relates generally to hard disk drive memory storage devices for computers and more specifically to disk drive apparatus and method for writing servotrack information and alleviating the need for a separate servowriter to establish such servopatterns on the recording surfaces of the recording media.

2. Description of the Prior Art

Increased levels of storage capacity in floppy and hard disk drives are a direct result of the higher track densities possible with voice-coil and other types of servo positioners. Previously, low track density disk drives were able to achieve satisfactory head positioning with leadscrew and stepper motor mechanisms. However, when track densities become so great that the mechanical error of a leadscrew-stepper motor combination is significant compared to track-to-track spacing, an embedded servo is needed so that the position of the head can be determined from the signals it reads.

Conventional hard disk manufacturing techniques include writing servotracks on the media of a head disk assembly (HDA) with a specialized servowriter instrument. Laser positioning feedback is used in such instruments to read the actual physical position of a recording head used to write the servotracks. Unfortunately, it is becoming more and more difficult for such servowriters to invade the internal environment of a HDA for servowriting because the HDAs themselves are exceedingly small and depend on their covers and castings to be in place for proper operation. Some HDAs are the size and thickness of a plastic credit card. At such levels of microminiaturization, traditional servowriting methods are inadequate.

Conventional servo-patterns typically comprise short bursts of a constant frequency signal, very precisely located offset from a data track's center line, on either side. The bursts are written in a sector header area, and can be used to find the center line of a track. Staying on center is required during both reading and writing. Since there can be between seventeen to sixty, or even more, sectors per track, that same number of servo data areas must be dispersed around a data track. These servo-data areas allow a head to follow a track center line around a disk, even when the track is out of round, as can occur with spindle wobble, disk slip and/or thermal expansion. As technology advances provide smaller disk drives, and increased track densities, the placement of servo data must also be proportionately more accurate.

Servo-data are conventionally written by dedicated, external servowriting equipment, and typically involve the use of large granite blocks to support the disk drive and quiet outside vibration effects. An auxiliary clock head is inserted onto the surface of the recording disk and is used to write a reference timing pattern. An external head/arm positioner with a very accurate lead screw and a laser displacement measurement device for positional feedback is used to precisely determine transducer location and is the basis for track placement and track-to-track spacing. The servo writer requires a clean room environment, as the disks and heads will be exposed to the environment to allow the access of the external head and actuator.

A method for writing a servo-pattern with a disk drive's own pair of transducers is described by Janz in U.S. Pat. No. 4,912,576, issued Mar. 27, 1990. Three types of servo-patterns are used to generate three-phase signals that provide a difference signal having a slope that is directly proportional to velocity. Servo-patterns that are substantially wider radially than the nominal track-to-track separation are possible. This helps improve readback amplitudes, and thus servo performance. Janz observes that the signal level from a transducer is a measure of its alignment with a particular pattern recorded on the disk. If the flux gap sweeps only forty percent of a pattern, then the read voltage will be forty percent of the voltage maximum obtainable when the transducer is aligned dead-center with the pattern. Janz uses this phenomenon to straddle two of three offset and staggered patterns along a centerline path intended for data tracks.

In a preferred process, Janz reserves one side of a disk for servo and the other side for data. The disk drive includes two transducers on opposite surfaces that share a common actuator. To format an erased disk for data initialization, a first phase servo is written on the servo side at an outer edge. The transducers are then moved-in radially one half of a track, as indicated by the first phase servotrack amplitude, and a first data-track is recorded on the data side. The transducers are again moved-in radially one half of a track, this time as indicated by the first data-track amplitude, and a second phase servotrack is recorded on the servo side. The transducers are again moved-in radially one half of a track, as indicated by the second phase servotrack amplitude, and a second data-track is recorded on the data side. The transducers are moved-in radially another one half of a track, as indicated by the second data-track amplitude, and a third phase servotrack is recorded on the servo side. The transducers are moved-in radially one half of a track, as indicated by the third phase servotrack amplitude, and a third data-track is recorded on the data side. This back-and-forth progress is repeated until the entire two surfaces are written. If too few or too many tracks were thus written, the disk is reformatted once more, but with a slight adjustment to step inward slightly more or slightly less than one-half a track width, as appropriate. Once the disk drive has been formatted with an entire compliment of properly spaced servotracks, the data-tracks have served their purpose and are erased in preparation of receiving user data. The circuitry to implement the method is described as not being a permanent part of the disk drive mechanism.

Unfortunately, the method described by Janz consumes one entire disk surface for servotracks and requires two heads working in tandem. Track-to-track bit synchronism is also not controlled, and seek times to find data between tracks would thus be seriously and adversely impacted. Transducer flying height variations and spindle runout that occur within a single revolution of the disk and media inconsistencies can and do corrupt radial position determinations that rely on a simple reading of off-track read signal amplitudes. Prior art methods are inadequate for very high performance disk drives.

SUMMARY OF THE PRESENT INVENTION

It is therefore an object of the present invention to provide a method to enable servo patterns to be written very accurately on data surfaces inside a sealed drive head disk assembly (HDA).

Another object of the present invention is to provide a method to allow sector header data, including but not limited to a Grey code or other code for identifying the track number, to be written on every data surface of a disk drive.

Yet another object of the present invention is to provide a method to allow a user to change a track pitch, a number of sectors per track, a Grey code, a drive speed or a write frequency, by modifying parameters within instructions for an embedded microprocessor.

A further object of the present invention is to provide a method for allowing a servo pattern to be written that is wider and/or narrower than a recording transducer.

Another object of the present invention is to provide a disk drive capable of writing its own servotracks with circuitry that is a permanent part of the disk drive.

A further object of the present invention is to provide a disk drive capable of writing its own servotracks using only one transducer and one disk surface.

Another object of the present invention is to provide a disk drive capable of writing its own servotracks and that maintains bit-synchronism between tracks wherein Grey Code sector header data may be included.

Briefly, a preferred embodiment of the present invention includes a hard disk drive comprising a rotating disk with a recording surface, a transducer in communication with the surface and servo-actuator means for radially sweeping the transducer over the surface, a variable gain read amplifier connected to the transducer, an analog to digital converter (ADC) attached to the variable gain amplifier, an erase frequency oscillator coupled to the transducer for DC erasing of the disk surface, a memory for storing digital outputs appearing at the ADC, and a controller for signaling the servo-actuator to move to such radial positions that result in transducer read amplitudes that are a percentage of previous read amplitudes represented in the digital memory. Bit-synchronism between tracks is maintained by writing an initial clock track with closure and then writing a next clock track including a regular sequence of clock bursts a half-track space offset such that the initial clock track can be read in between writing clock bursts and the read signal is used to frequency-lock an oscillator which is used as a reference for the writing of clock bursts of the next track. A checkerboard pattern of clock bursts is thus created. All subsequent tracks are built incrementally by stepping off a half of a track from the last track written, which comprises clock bursts, and writing a next new sequence of clock bursts that interlace with the previous track's clock bursts.

An advantage of the present invention is that it provides a disk drive that maintains with its own resources accurate radial and rotational positional references.

An advantage of the present invention is that it provides a disk drive that does not require an external positioner/actuator or feedback system.

Another advantage of the present invention is that it provides a disk drive that can write servo bursts that are wider and/or narrower than the flux gap of the transducer.

An advantage of the present invention is that it provides a disk drive that is economical to manufacture because expensive servowriting equipment is not required.

A still further advantage of the present invention is that it provides a disk drive that can do field rewrites of corrupted or damaged servo information.

Another advantage of the present invention is that it provides a disk drive that maintains synchronous transition placement between tracks.

Another advantage of the present invention is that it provides a disk drive that is compatible with zone bit recording techniques.

These and other objects and advantages of the present invention will no doubt become obvious to those of ordinary skill in the art after having read the following detailed description of the preferred embodiments which are illustrated in the various drawing figures.

DETAILED DESCRIPTION OF THE PREFERRED EMBODIMENTS

Figure 1:
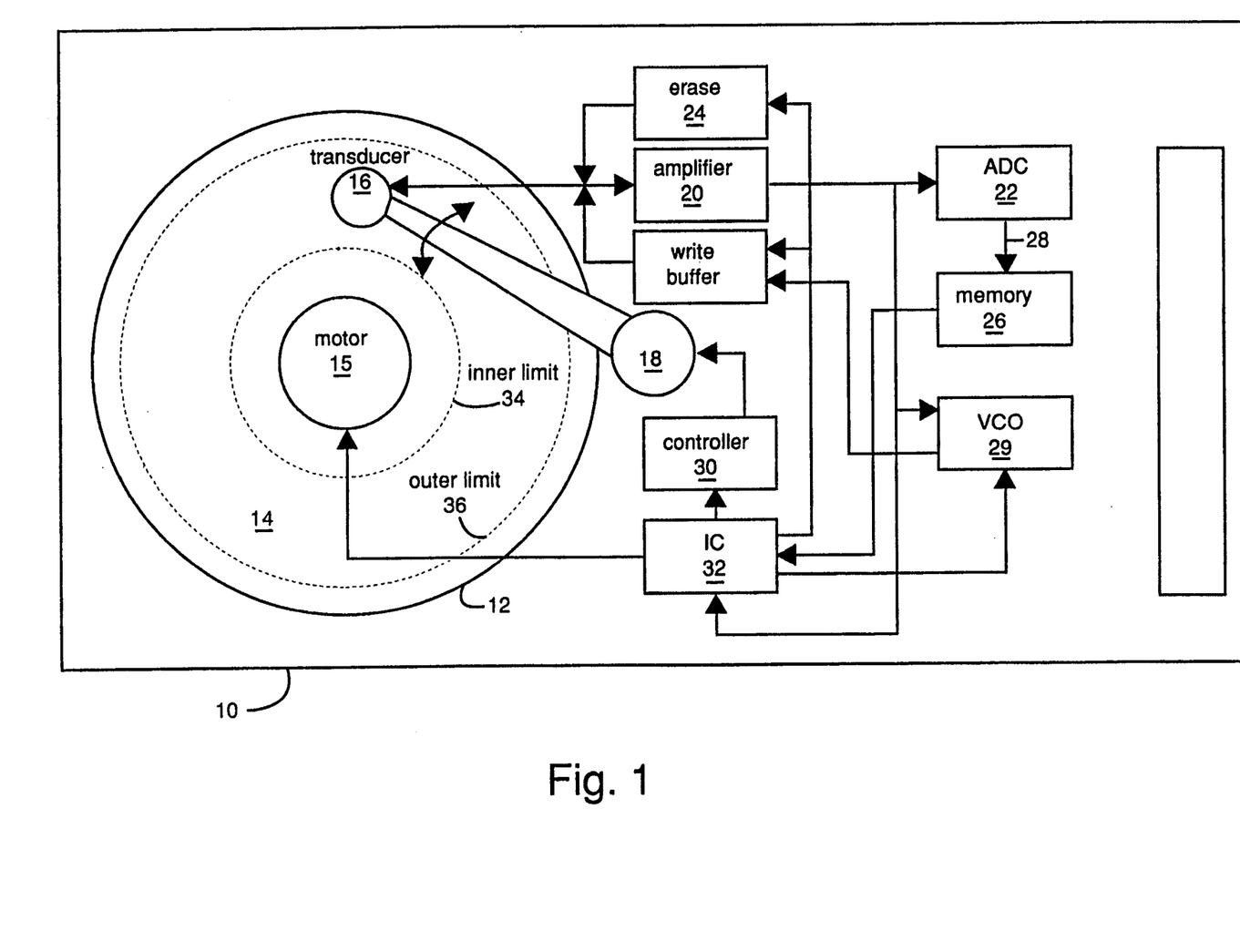
FIG. 1 is a functional block diagram of a hard disk drive embodiment of the present invention.

FIG. 1 illustrates a hard disk drive 10 comprising a rotating disk 12 with a recording surface 14, a spindle motor 15, a transducer 16 in communication with the surface 14 and swept radially over the surface 14 by a servo-actuator 18, a variable gain read amplifier 20 connected to the transducer 16, an analog-to-digital converter (ADC) 22 attached to the variable gain read amplifier 20, an erase frequency oscillator 24 coupled to the transducer 16 for direct current (DC) erasing of the disk surface 14, a memory 26 for storing a plurality of digital output signals 28 appearing at the ADC 22, a variable clock oscillator (VCO) 29 that provides an output reference frequency and can be locked-on to a sample clock read by transducer 16, and a controller 30 for signaling the servo-actuator 18 to move to such radial positions that result in transducer read amplitudes that are a predefined percentage of previous read amplitudes represented in the digital memory 26. Actuator 18 may comprise a conventional voice coil motor.

In actual operation, it may not be reasonable to assume that surface 14 is clean of signals and erased, therefore the surface 14 must be erased track-by-track without the aid of servotracks. Thereafter, servotracks are later written by a method described in connection with FIG. 4. Preferably, an integrated circuit 32 is included in disk drive 10 to control the erasing and writing of servotracks and associated patterns on surface 14. Spindle motor 15 is controlled by IC 32 to rotate surface 14 at a nominal drive velocity. IC 32 causes transducer 16 to write either a constant frequency signal or one that is slewed between a fundamental frequency (1F) and twice the fundamental frequency (2F).

Simultaneously, servo-actuator 18 is caused to sweep transducer 16 between a pair of inner and outer mechanical limits (34 and 36). The sweeping and writing is continued by IC 32 for at least fifty passes and is intended to insure that some non-coherent data will be in every useful track location. Transducer 16 is then positioned at inner mechanical limit 34 and directed to write the 2F signal for at least one disk revolution period. The transducer is caused to read and the variable gain read amplifier is adjusted such that the maximum amplitude signal read from the disk is between ninety and one hundred percent (90%-100%) of the ADC, which functions as an amplifier output measurement device. A digital value produced by the ADC is a representation of a complete track amplitude maximum and is stored in memory for later reference by IC 32. The present track is then DC-erased by causing transducer 16 to be energized in one polarity for a time longer than one complete disk revolution period. IC 32 signals to the servo-actuator, cause transducer 16 to move away from the inner mechanical limit 34 while transducer 34 is reading. As soon as any data read is half of the stored full track amplitude reference, transducer movement is stopped. If the read amplitude of any data is greater than fifty percent, the transducer is moved toward the inner mechanical limit 34 until the maximum amplitude is fifty percent of the full track amplitude. At such a point, the transducer is probably positioned half over random data and half over the previously erased part of surface 14. As before, signals from IC 32 cause a DC-erase signal to be sent to transducer 16 for at least one disk revolution time period. The steps of moving and erasing are repeated until the transducer encounters the outer mechanical limit 36 as sensed by the inability of the servo-actuator to move transducer 16 to a fifty percent amplitude point. Substantially all of a useful portion of surface 14 is thereby erased in preparation for servo-patterning.

FIGS. 2A through 2G illustrate, with a sequence of increment steps, how the surface 14 is written with servotracks and prepared ultimately for user data storage.

Figure 2A:
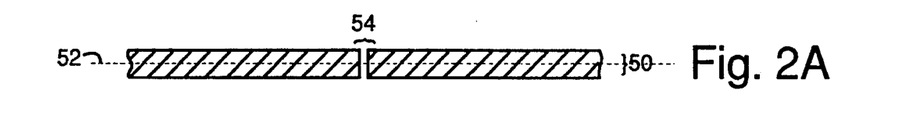
FIG. 2A is a top view of a portion of a clock track before and after a reference gap in which the clock track has been recorded in a concentric ring on a surface of a disk.

IC 32 causes a clock track 50 "with closure" to be written on surface 14 (FIG. 1) along a centerline 52 that is proximate to outer limit 36 (FIG. 1). Closure is defined as the condition in which one complete revolution of a track comprises a known number of equidistant clock transitions with a last transition having substantially the same spacing as a first transition, or at least within ten percent of being equal. Reading the clock track 50 will produce a constant frequency signal with a known number of clock transitions per revolution. In order to mark a beginning of each revolution of the disk, a gap 54 is created in the clock track 50 which comprises an integer number of missing clock transitions, e.g., three transitions (3T) to thirty transitions (30T). A count of the total number of clock transitions in a clock track 50, as treated herein, includes the omitted clock transitions in the reference gap 54.

In order for IC 32 to propagate servotracks and their associated half-track offset "A" and "B" bursts without the aid of an external servowriter and laser position determination instrument, clock track 50 is divided into a number of sectors approximately equal to that number of user data sectors anticipated for drive 10 in its final application. Thirty-two sectors is a typical value. Each sector is divided into an even integer number of segments. Each segment has to be long enough to allow transducer 16 to recover from a transducer write/read channel write to read transition and long enough for the VCO 29 to lock-on. However, each segment must not be so long that VCO 29 can drift without active input correction for more than, preferably, 0.01 percent. Nor should each segment be so long that the disk rotation time can drift by more than 0.01 percent. The VCO drift time and disk rotational drift time will, of course, be dependent on particulars of individual disk drive implementations, and may be determined empirically. Ten to fourteen segments per sector are typical numbers. For example, with thirty-two sectors and fourteen segments per sector, there will be 448 segments per whole clock track 50. For drawing clarity, FIGS. 2A through 2G show only the first few and the last few segments of a track and are not necessarily illustrated to scale, e.g., ten segments are the same length as one sector.

The speed of the motor 15 may be adjusted by IC 32 such that the relationship between the rotational period and transducer write frequency results in the number of transitions per revolution being an exact integer number of transitions per segment and a more-or-less equal number of transitions per segment. Gap 54 is created by controlling transducer 16 to write DC for a period corresponding to 30T and then a 2F frequency is written for a number of transitions minus three which will exactly fill one revolution of a track. The number of transitions per revolution is preferably calculated using the disk rotational period and the drive 2F frequency. Transducer 16 measures the results for proper gap length by reading back the just recorded track 50 and non-data gap 54. If gap 54 is shorter than 3T, spindle motor 15 is controlled by IC 32 to slow the disk rotational speed, e.g., approximately 0.1 percent. If gap 54 is longer than 30T the spindle motor speed is increased. The procedure of DC-erasing followed by writing 2F data is repeated and the length of gap 54 measured again. When the length of gap 54 is between 3T and 30T, it is then further checked to determine if there are an integer number of transitions. If a division remainder (gap 54 length divided by the T period length) is less than ten percent of a T-period length, the clock track 50 is closed. The ten percent criterion is arbitrary, and other values may be used according to user requirements.

An exact total number of transitions in clock track 50 is determined by calculating the number of transitions that could be placed in gap 54 and adding the number of transitions read in the remainder of the revolution or by counting the number of transitions as they are written, and adding the number that could fit in gap 54. Since it is unlikely that the total number of transitions in the revolution will be an integer multiple of 448, 447 segments will contain an equal number of transitions and a 448th segment will contain the same number of transitions plus any remaining number of transitions.

In order to determine when transducer 16 has been moved one-half track width inward from centerline 52, a reduction in data read amplitudes is used as an indicator. A table of on-track data amplitudes is gathered and stored in memory 26. To determine position relative to track 50, transducer 16 is caused to read continuously while on centerline 52 and the gain of amplifier 20 is adjusted to have its maximum output in any one revolution between ninety and one hundred percent of the full-scale measurement range of ADC 22. The gain of amplifier 20 is then fixed, and an amplitude sample is taken in each half sector for every sector in the revolution and their digital values stored in the table in memory 26. Sixty-four samples in all are typically gathered. Each amplitude sample value is divided by two before being stored in the table. Differences among the amplitudes of individual samples are often the result of variations in disk magnetic coating thickness and characteristics. Too wide a difference indicates a defective disk surface 14. A difference between the minimum and maximum value is computed by IC 32 and compared against a user-selected value. If exceeded, the disk 12 is rejected as having excessive modulation and the servowriting process is preferably terminated.

In typical disk drives, flying height variations of a transducer will occur due to the media not being absolutely flat and/or the media surfaces not being at perfect right angles to the axis of the spindle. In the present example, as transducer 16 is forced away from surface 14, a side-fringing of the write signal will cause the track being written to be wider than a flux gap within transducer 16. Variations in read amplitude will also follow flying-height variations, even if the track being read has a perfectly uniform width. If transducer 16 experiences variations in flying height, the edges of track thus read or written will wobble in and out with respect to a perfect circle concentric on the axis of the spindle.

Figure 2B:
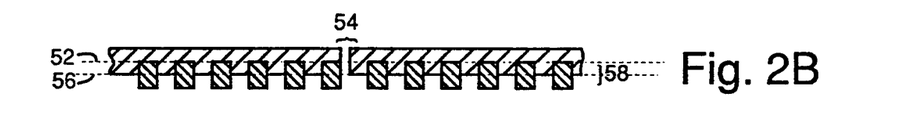
FIG. 2B is a top view of the clock track of FIG. 2A after a first track sequence of A-bursts have been recorded a half of a track width offset from the clock track.

Servo-actuator 18 is controlled by IC 32 to keep transducer 16 at a radial position that maintains a predetermined read amplitude. FIG. 2B shows this position as centerline 56, which is a half-track width from centerline 52. A series of target servo amplitudes is input from the table in memory 26 corresponding to the approximate longitudinal position of transducer 16 along track 50. As transducer 16 reads each first half of a sector, a half-amplitude for that sector's half from memory 26 is used for a servo target amplitude. As disk 12 rotates, the servo target amplitude is updated with the next value. IC 32 compares the actual read amplitudes with the servo target amplitudes and controls servo-actuator 18 so that the two amplitudes converge and reconverge in realtime as track 50 moves through its whole length under transducer 16.

Further refinement of the half-amplitude servo position scheme is possible. Hunting can be reduced or substantially eliminated by a process of smoothing the servo error control signals. For each of sixty-four servo sample points, a read amplitude is compared with the target amplitude from the table in memory 26. A mean, or average value between corresponding target and measured amplitudes may be stored in the table as a series of new target values. Such smoothing is preferably repeated for three revolutions of disk 12. If the difference between any target and measured value is greater than a user selected percentage, disk 12 may be rejected for having excessive modulation and the process terminated. After three revolutions of smoothing, transducer 16 may be servo controlled by IC 32 half-offset from an adjacent track without significant hunting or dither, and will be positioned exactly.

Transducer 16 is positioned to write the next track when it is over centerline 56 (FIG. 2B). Every possible segment location is not written on an A-burst track 58. Instead, every other segment is written such that parts of track 50 still reach centerline 56, and those parts are available to keep the write oscillator 29 synchronized with clock track 50 while writing track 58. Therefore, one segment per half sector may be used to servo transducer 16 and provide enough points of correction to maintain a correct radial position on centerline 56. Such alternate segments may be written with data generated from a memory image of a sector construction. Three pattern types are ultimately used: an A-servo burst such as in track 58, a B-servo burst and a drive sector ID field including a Grey code or some other track identification code. Only a first segment in each sector is in position to ultimately become the A-burst of a user AB-type servo burst. In order not to lose the rotational position of the once-around-marker, gap 54, the first segment of each track of any servo burst is preferably written to include a once-around-marker, for example, a 12T DC-erased gap.

Figure 2C:
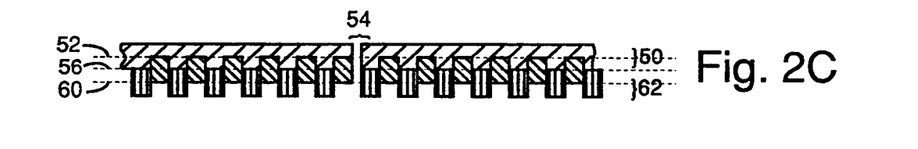
FIG. 2C is a top view of the tracks of FIG. 2B after a first track sequence of clock-bursts have been recorded a half of a track width offset from the A-burst track.

Once 224 full track-width segment bursts comprising track 58 are written, transducer 16 is caused to read and amplifier 20 gain is controlled by IC 32 to result in a maximum reading between ninety and one hundred percent while over centerline 56. Again, one amplitude sample per sector, this time of track 58, is gathered, then divided by two and stored in the table in memory 26 as a new set of servo target amplitudes. Servo-actuator 18 is controlled by IC 32 while using table target values as amplitude references for a correct transducer placement off the most recently written segment bursts, track 58. This positions transducer 16 one-half a track width closer to the inner radius from the most recently written segment bursts, along a centerline 60 (FIG. 2C). Again, for three revolutions, the target amplitudes are compared to a series of read-in amplitudes, and the mean values are computed and stored by IC 32 in memory 26 as the new target servo amplitude values. Thus track edge smoothing is repeated. After which such process transducer 16 can be assumed to be positioned exactly one-half a track width toward the inner radius from the previously written segments. A series of alternating segments are written in a track 62 while switching back transducer 16 every other segment time to read-in parts of track 58 in order to keep VCO 29 locked-in and synchronized to the clock transitions within track 58 and thus to also be synchronized with the clock transitions constituting clock track 50. As before, the back and forth switching between reading a previous track to lock-in VCO 29 and writing bursts for the next track 62 maintains bit-synchronism track-to-track. The segments which are selected for writing track 58 are one segment shifted from those segments selected for writing track 62. This allows a checkerboard pattern of sample clock transitions that may be read at half amplitude while writing a next track. One segment in each sector will ultimately be a user sector header field and will contain sync fields, Grey codes or other track identification. These user definable data may exist as model patterns within a micro processor memory and may be written at this point.

Figure 2D:
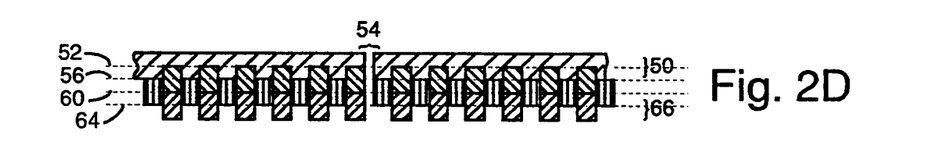
FIG. 2D is a top view of the tracks of FIG. 2C after a sequence of B-bursts have been recorded a half of a track width offset from the first clock-burst track.

The process of reading full track amplitude, storing half the amplitude, using these half-amplitudes to servo to the next half track, edge-smoothing and writing the next 224 segments is repeated again along a centerline 64 to create a B-burst track 66 (FIG. 2D). Although several segments per sector are typically written, only one segment per sector, the first segment, will ultimately become the B-burst of a user AB-servo burst.

Figure 2E:
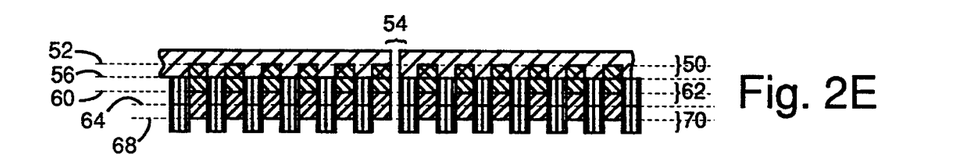
FIG. 2E is a top view of the tracks of FIG. 2D after a second sequence of clock bursts have been recorded a half of a track width offset from the B-burst track.

FIG. 2E shows a centerline 68 a half a track width offset from centerline 64. A track 70 is recorded along centerline 68 with bursts in segments interlaced with those of track 66.

Figure 2F:
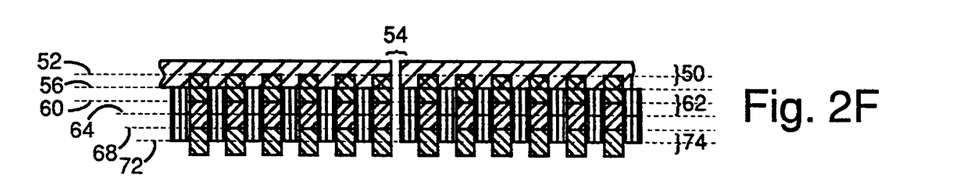
FIG. 2F is a top view of the tracks of FIG. 2E after a second track sequence of A-bursts have been recorded a half of a track width offset from the second sequence of clock bursts.

FIG. 2F shows a centerline 72 a half a track width offset from centerline 68. A track 74 is recorded along centerline 72 with bursts in segments interlaced with those of track 70.

This incremental process is repeated until transducer 16 encounters a mechanical stop, e.g., limit 34. A limit is recognized by seeing read amplitudes that cannot be reduced to respective half-amplitudes by continuing to increase the voice coil current to servo-actuator 18. Preferably a count of the tracks written has been maintained by IC 32 in memory 26, and if the total number of tracks written between the outer to inner mechanical stops is not within a user preset range, the process is restarted at the DC-erase step from the inner stop step and the fifty percent of full track amplitude servo target is changed to a value inversely related to the percentage error in the track count. This process is continuously re-corrected and re-started until a track count within the user selected range is obtained.

Figure 2G:
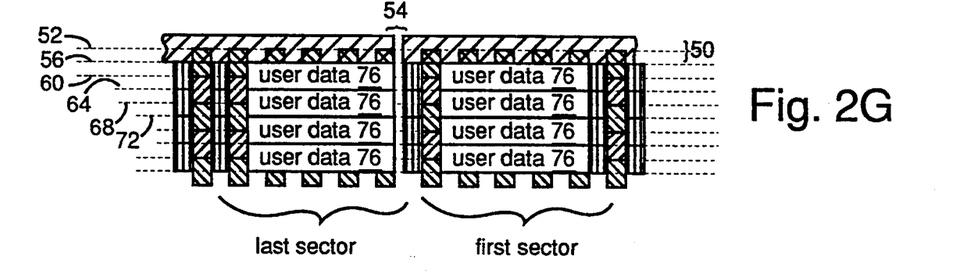
FIG. 2G is a top view of the first and last sectors of four tracks after writing user data areas that leave a single set of AB-bursts per sector.

FIG. 2G shows the beginning and ending sectors of the first four tracks thus obtained. A user data area 76 within each sector is overwritten such that an AB-burst pair straddles the centerline of each user data area 76. When transducer 16 is not exactly centered over the user data area 76, one of the A-burst or B-burst will be read with an amplitude greater than the other, and servo-actuator can be controlled to correct the positioning error.

If servo tracks are to be written to more than one surface on a disk drive, after transducer 16 has written the new segments servoing and using the half-amplitude segments for VCO synchronization, transducers 16 associated with other disk drive surfaces 14 write and alternately read the first surface for a clock reference. This causes the data written to the other surfaces to be exactly placed rotationally and radially with respect to the first surface.

Figure 3:
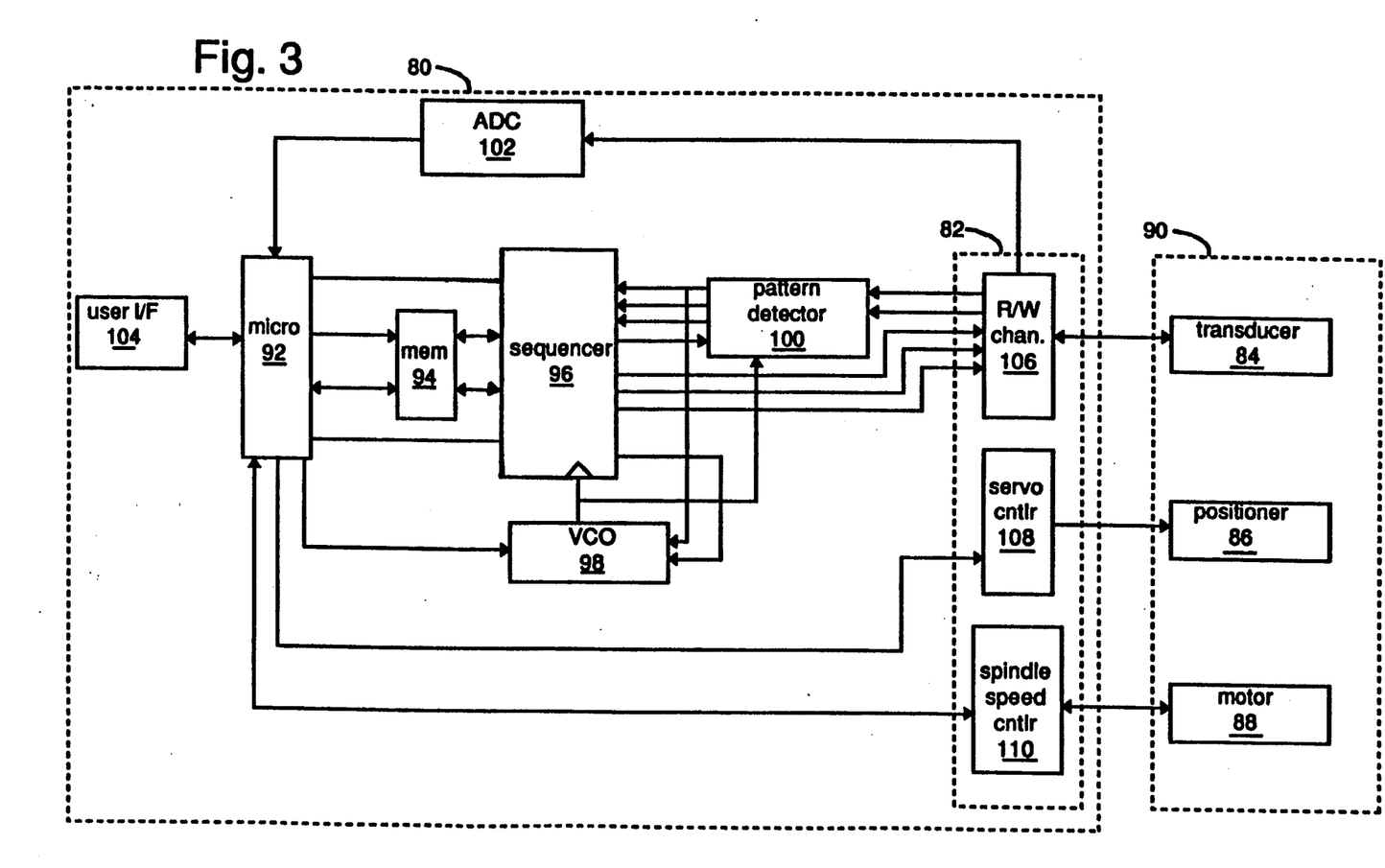
FIG. 3 is a block diagram of a system embodiment of the present invention for using the methods of the present invention in conjunction with commercially available head disk assemblies.

Conventional disk drives without special provisions or interfaces for self-servowriting can nevertheless be servowritten with the aid of a system 80 illustrated in FIG. 3. The system 80 comprises a personality module 82 that interfaces to a transducer 84, a positioner 86 and a spindle motor 88 within an external and conventional head disk assembly (HDA) 90. HDA 90 is a commercially available unit as marketed by Conner Peripherals, Seagate, NEC and others. System 80 further comprises a microprocessor 92, a memory 94 including both read-only memory (ROM) and random access memory (RAM), a sequencer 96, a VCO 98, a pattern detector 100, an ADC 102 and a user interface 104. Personality module 82 is detachable and may be replaced with another module suited to HDA 90. Several specific personality modules 82 may be constructed to interface system 80 to a range of commercially available HDAs 90. The interfacing requirements, will of course, depend on the particular characteristics of the HDA 90. Cabling between personality module 82 and HDA 90 preferably conforms to connector formats included in HDA 90.

Personality module 82 comprises a read/write (R/W) channel 106, a servo controller 108 and a spindle speed controller 110. Zero-crossing and level signals are communicated from R/W channel 106 to pattern detector 100, which, in turn, communicates those and match and data signals to sequencer 96. Non-return-to-zero (NRZ), write gate and sample/hold signals are output from sequencer 96 to R/W channel 106. VCO 98 provides a clock signal to both sequencer 96 and pattern detector 100. The configuration and programming mechanics of microprocessor 92 and memory 94 are conventional. The uses of memory 26 (FIG. 1) may also be supported by memory 94, as well as the activities of IC 32 supported by microprocessor 92 executing the procedures described in connection with FIG. 4. Transducer 84 is similar to transducer 16 (FIG. 1), as are positioner 86 to servo-actuator 18 (FIG. 1) and motor 88 to motor 15 (FIG. 1). It would be practical to incorporate the elements of system 80 within an otherwise conventional HDA 90 to gain the self-servowriting benefits of the present invention in a standalone device.

Figure 4:
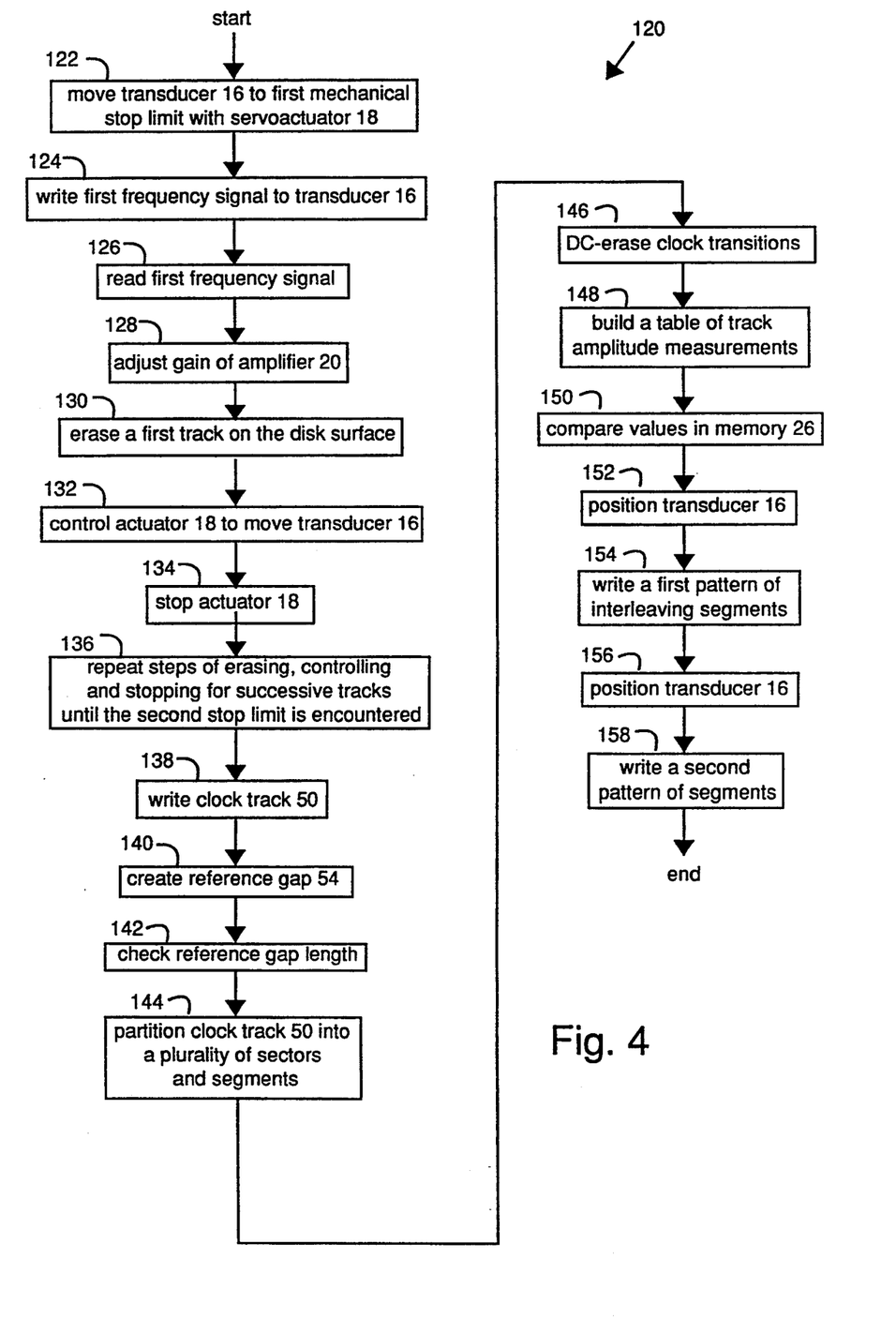
FIG. 4 is a flowchart of a method of the present invention executable by the system of FIG. 3 or the disk drive of FIG. 1 to produce the track patterns of FIGS. 2A through 2G.

A method embodiment of the present invention is illustrated with the flowchart of FIG. 4. A process 120 comprises a step 122 of moving transducer 16 (FIG. 1) to a first mechanical stop limit with servo-actuator 18. A step 124 includes writing a first frequency signal to transducer 16 for a period longer than the time period of a single revolution of the disk 14. A step 126 includes reading said first frequency signal with variable gain amplifier 20. A step 128 adjusts the gain of amplifier 20 to result in a digital value 28 at the output of ADC 22 that is within the range of ninety to one hundred percent of a full-scale range of said ADC and storing said digital value in memory 26. A step 130 includes erasing a first track on the disk surface with direct current applied to transducer 16. A step 132 includes controlling the actuator 18 to move transducer 16 away from the first stop limit toward a second stop limit while simultaneously reading a signal from transducer 16. A step 134 includes stopping the movement of the actuator 18 when the amplitude of a signal read by transducer 16 is approximately one-half of a value represented by the ADC digital value read from memory 26. A step 136 includes repeating the steps of erasing, controlling and stopping for successive tracks until the second stop limit is encountered by servo-actuator 18, wherein the useful area of disk surface 14 is substantially erased. A step 138 writes clock track 50 with transducer 16 to result in a sequence of signal transitions in which a last transition joins with a first transition to produce a whole integer number of transitions. A step 140 includes omitting a fixed number of clock transitions in clock track 50 to create reference gap 54. A step 142 checks the reference gap length. A step 144 includes partitioning clock track 50 into a plurality of sectors and each of the sectors into a plurality of segments, wherein a number of clock transitions are contained within each segment. A step 146 causes a DC-erasing of a number of clock transitions in each of a first and a second segment of each sector to divide all the sectors into two parts and in relation to the reference gap in the clock track 50. A step 148 builds a table of track amplitude measurements in memory 26 by sampling, via transducer 16 and variable gain amplifier 20, a signal obtained from segments in each of the two parts of each sector and digitized by ADC 22 and storing half of each corresponding digital value in memory 26. A step 150 compares a lowest digital value in memory 26 table thus obtained with a highest digital value in memory 26 and rejects the disk drive as defective if the comparison exceeds a predetermined amount. A step 152 includes positioning transducer 16 one-half track toward the second stop limit with servo-actuator 18, as determined by comparing segment-by-segment and sector-by-sector a plurality of read amplitudes obtained simultaneously from transducer 16 with their corresponding digital values used as target values in memory 26. A step 154 includes writing a first pattern of interleaving segments and reading intervening segments from a preceding clock track 50 with transducer 16 to maintain a frequency lock of clock oscillator VCO 29 which is used to generate the clock transitions wherein track-to-track bit-synchronism is maintained. A step 156 includes positioning transducer 16 one-half track further toward the second stop limit with servo-actuator 18 as determined by comparing a plurality of read amplitudes related to the first pattern obtained simultaneously from transducer 16 with their corresponding digital values used as target values in memory 26. A step 158 includes writing a second pattern of segments aligned side-by-side with segments of the first pattern and reading intervening segments from a preceding clock track 50 with transducer 16 to maintain a frequency lock of a clock oscillator used to generate the clock transitions wherein track-to-track bit-synchronism is maintained. FIGS. 2A through 2G are representative of the condition of surface 14 as process 120 progresses from step to step.

Although the present invention has been described in terms of the presently preferred embodiments, it is to be understood that the disclosure is not to be interpreted as limiting. Various further alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A method for writing servotracks, with a single transducer, on a recording surface of a disk drive that includes a rotating disk, a transducer, and an actuator for moving said transducer radially over said surface of said disk, comprising the steps of:
    a) moving said transducer to a first stop limit with said actuator;
    b) writing a first frequency signal on said disk with said transducer for a period of time longer than that necessary for a single revolution of said disk;
    c) reading said tint frequency signal with a variable gain amplifier connected to said transducer;
    d) adjusting a gain of said variable gain amplifier to provide a digital value corresponding to the amplitude of said first frequency signal at the output of an analog-to-digital converter (ADC) within the range of ninety to one hundred percent of a full-scale range of said ADC and storing said digital value in a memory;
    e) writing a track with said transducer to result in a sequence of signal transitions in which a last transition joins with a first transition to produce a whole integer number of transitions in said track;
    f) omitting a fixed number of transitions in said track to create at least one reference gap;
    g) dividing said track into a plurality segments wherein a number of transitions are contained within each segment;
    h) sampling the amplitude of a signal obtained from at least one of said segments and storing a target fraction of each corresponding digital value in a memory table built from such samples;
    i) positioning said transducer toward a second stop limit with said actuator as determined by comparing, segment-by-segment, a plurality of read amplitudes obtained simultaneously from said transducer with corresponding digital values used as target values in said memory table;
    j) repeatedly writing a first pattern of interleaving segments and reading intervening segments from an immediately preceding track with said transducer;
    k) positioning said transducer further toward the second stop limit with said actuator as determined by comparing a plurality of read amplitudes related to said first pattern obtained simultaneously from said transducer with their corresponding digital values used as target values in said memory table;
    l) dynamically updating said memory table;
    m) averaging over a plurality of revolutions of said disk, said read amplitudes with said target values generating a smoothed average of updated amplitude target values in the memory table;
    n) writing a second pattern of segments aligned with segments of said first pattern such that said second pattern is circumferentially alternating and radially overlapping with said first segments, and reading intervening segments from a preceding track with said transducer while positioning the transducer with the actuator as determined by comparing the read amplitudes related to the preceding track with the corresponding smoothed average updated amplitude target values in the memory table; and
    o) successively repeating steps k through n until the second stop limit encountered.

2. The method of claim 1, wherein:
    said table is built by sampling with said transducer and variable gain amplifier.

3. The method of claim 1, wherein:
    said disk surface is erased with direct current applied to said transducer.

4. A method for writing substantially concentric servotracks, with a single transducer, on a recording surface of a disk drive that includes a rotating disk, a transducer, an actuator for moving said transducer radially over said surface of said disk, a first stop limit and a second stop limit, comprising the steps of:
    a) erasing said disk surface;
    b) positioning said transducer proximate said first stop limit;
    c) writing a first track with said transducer such that a sequence of signal transitions in which a last transition joins with a first transition to produce an integer number of transitions is formed in said first track;
    d) omitting a fixed number of transitions in said first track to create at least one reference gap;

e) dividing said first track into a plurality of segments wherein an integer number of transitions are contained within each segment;

f) initializing a memory with values corresponding to a target fraction of the amplitude of the values read from sample points on said first track, wherein said fraction is less than 1.0;

g) positioning said transducer toward said second stop limit with said actuator by:
   (1) reading and digitizing a plurality of samples from a current track position over said disk surface;
   (2) radially offsetting said transducer from said current position to a position where said samples have a value approximately equal to the corresponding value stored in said memory table; and
   (3) averaging at least one of said read sample values for each corresponding memory value with that corresponding memory value and storing the result in said memory table as a new value for said corresponding memory value; and
   (4) comparing a plurality of read amplitudes obtained simultaneously from said transducer with the corresponding digital values in the memory table;

h) writing a first pattern of interleaving segments and reading intervening segments from an immediately preceding track with said transducer; and i) positioning said transducer further toward said second stop limit with said actuator by:
   (1) reading and digitizing a plurality of amplitude samples from a current track position over said disk surface to build a track amplitude profile;
   (2) radially offsetting said transducer from said current position to a position where said samples have a value approximately equal to the corresponding value stored in said memory table; and
   (3) averaging at least one of said read sample values for each corresponding memory value with that corresponding memory value and storing the result in said memory table as a new value for said corresponding memory value; and
   (4) comparing a plurality of read amplitudes related to said first pattern obtained simultaneously from said transducer with the corresponding digital values in the memory table;

j) writing a second pattern of segments aligned with segments of said first pattern such that said second pattern is circumferentially alternating and radially overlapped with said first pattern and reading intervening segments from a preceding track with said transducer.

5. The method of claim 4 wherein a positional relationship between said first stop limit and said second stop limit is such that said first stop limit is closer to an outer circumferential edge of said disk than said second stop limit and said second stop limit is closer to an inner circumferential edge of said disk than said first stop limit.

6. The method of claim 4 wherein a positional relationship between said first stop limit and said second stop limit is such that said first stop limit is closer to an inner circumferential edge of said disk than said second stop limit and said second stop limit is closer to an outer circumferential edge of said disk than said first stop limit.

7. The method of claim 4 further comprising repeating steps (g), (h), (i) and (j) until said second stop limit is reached.

8. The method of claim 4 further comprising:
repeating steps (g)(1)–(g)(4) a predetermined number of times.

9. The method of claim 4 further comprising:
repeating steps (g)(1)–(g)(4) three times.

10. The method of claim 4 further comprising:
repeating steps (i)(1)–(i)(4) a predetermined number of times.

11. The method of claim 4 further comprising:
repeating steps (i)(1)–(i)(4) three times.

* * * * *